United States Patent [19]

Sasaki

[11] Patent Number: 4,837,763
[45] Date of Patent: Jun. 6, 1989

[54] MULTIPLEXER FOR MULTIPLEXING INSERTION CODES AND A DIGITAL DATA SIGNAL TRAIN

[75] Inventor: Katsuhiro Sasaki, Tokyo, Japan
[73] Assignee: NEC Corporation, Tokyo, Japan
[21] Appl. No.: 75,903
[22] Filed: Jul. 20, 1987
[30] Foreign Application Priority Data

Jul. 23, 1986 [JP] Japan .................................. 61-173209

[51] Int. Cl.$^4$ ............................................. H04J 3/04
[52] U.S. Cl. .................... 370/112; 307/243; 328/104
[58] Field of Search ................ 370/69.1, 120, 76, 112, 370/110.1, 111; 307/243, 242; 328/104, 105; 375/53

[56] References Cited

U.S. PATENT DOCUMENTS

| | | | |
|---|---|---|---|
| 3,676,684 | 7/1972 | De Lange | 370/112 |
| 4,182,988 | 1/1980 | Murakami | 375/53 |
| 4,381,560 | 4/1983 | Farrow | 370/112 |
| 4,485,478 | 11/1984 | Takada | 375/60 |

Primary Examiner—Robert L. Griffin
Assistant Examiner—Frank M. Scutch, III
Attorney, Agent, or Firm—Sughrue, Mion, Zinn, Macpeak & Seas

[57] ABSTRACT

A multiplexer includes first and second frequency dividers and first and second selectors. The first frequency divider receives a clock signal which determines a multiplexing time slot and outputs a first signal every M ($M \geq 2$) time slots. The second frequency divider receives the first signal from said first frequency divider and outputs N ($N \geq 1$) second signals having different phases. The first selector converts N insertion codes such as a frame synchronization code and a service code into one code signal train on the basis of the second signals. The second selector receives a digital data signal train having an alternate repetition of a digital data signal using ($M-1$) continuous time slots and a gap of one time slot and inserts the insertion codes of the code signal train on the basis of the first signal.

4 Claims, 4 Drawing Sheets

MULTIPLEXER FOR MULTIPLEXING INSERTION CODES AND A DIGITAL DATA SIGNAL TRAIN

BACKGROUND OF THE INVENTION

The present invention relates to a multiplexer and, more particularly, to a multiplexer for inserting a frame synchronization code, a service code, or the like in a digital data signal train.

In a sending end in digital multiplex communications, a multiplexer having a function for multiplexing digital data signals and various code signals in time slots in response to a clock signal having a predetermined frequency plays an important role. FIG. 1 shows a conventional multiplexer. This multiplexer basically comprises a 1/M frequency divider 1, a 1/N frequency divider 2, and a selector 3.

FIG. 2 is a timing chart of signals generated in the multiplexer shown in FIG. 1. Referring to FIGS. 1 and 2, the frequency divider 1 receives a clock signal S10 for determining a length of one time slot and generates a signal S11 every M time slots. The signal S11 is input to the frequency divider 2 and to an input terminal S0 of the selector 3.

The frequency divider 2 generates N signals S22-1 to S22-N having different phases on the basis of the output signal S11 of the frequency divider 1. The signals S22-1 to S22-N are input to the input terminals S1 to SN of the selector 3, respectively. It should be noted that M usually represents 16 to 30 and N represents 4 to 8. For illustrative convenience, however, M=4 is given.

The selector 3 has (N+1) data input terminals D0 to DN, (N+1) control signal input terminals S0 to SN, and one data output terminal O. The data input terminal Di is paired with the corresponding control signal input terminal Si, where i is 0 to N. If the nth control signal input terminal Sn is set at logic "1" the signal input to the paired data input terminal Dn appears at the output terminal O.

Referring to FIG. 1, a digital data signal train S13-0 is input to the data input terminal D0 of the selector 3. The output signal S11 of the frequency divider 1 is input to the control signal input terminal S0. N insertion code signals S13-1 to S13-N are respectively input to the data input terminals D1 to DN of the selector 3. The output signals S22-1 to S22-N from the frequency divider 2 are respectively input to the control signal input terminals S1 to SN.

In the digital data signal string S13-0, each digital data signal using (M−1) time slots (three in this embodiment) and each gap G of one time slot alternately appear.

The signal S11 is set at logic "1" for three time slots in which digital data is present in the digital data signal train 13-0 and is set at logic "0" for one time slot in which digital data is not present therein.

The content of each of the N insertion code signals S13-1 to S13-N is kept unchanged for a time interval between the start and end output signals S22-1 and S22-N output from the frequency divider 2, as shown in FIG. 2. Therefore, the frequency of the insertion code signal is set to be 1/(N×M) of the digital data signal train S13-0.

The selector 3 outputs the digital data signal train S13-0 for a period in which the output signal S11 from the frequency divider 1 is kept at logic "1". However, the selector 3 outputs the insertion code signals S13-1 to S13-N in time slots respectively corresponding to the phases of the output signals S22-1 to S22-N from the frequency divider 2. As shown in FIG. 2, the insertion code signals (i05, i11, i12, i13, i14, i15, i21, . . . ) are properly inserted in the digital data signal train S13-0, thereby preparing a multiplexed signal S16.

An arrangement of the selector 3 used in FIG. 1 is shown in FIG. 3. The selector 3 includes (N+1) 2-input AND circuits 51-0 to 51-N and a plurality of multi-input OR gates 52, both of which constitute a multiple stage. A maximum operating frequency of the selector 3 is determined by the operating speeds of the respective logic circuits and propagation delay times between the respective stages. The selector 3 having the above arrangement is not suitable for high-speed digital signal processing, because it has to process signals of different speeds, i.e., the high-speed digital data signal train S13-0 and the low-speed insertion code signals whose frequency is 1/(N×M), e.g., a maximum of 1/240, of the digital data signal. In other words, the operating frequency of the multiplexer depends on the number of insertion code signals, and therefore, the high-speed multiplexing cannot be achieved. Also, when the total propagation delay time of the circuit is so long that a predetermined operating frequency cannot be obtained, the selector 3 must be opened at a predetermined position thereof, and a circuit element for controlling the operation timings must be inserted in the opened position.

This results in that the size of the selector 3 is increased in proportion to the number of insertion codes, and power consumption is undesirably increased.

Even if a relatively low frequency is set so as to allow use of MOS (metal oxide semiconductor) devices which consume less power and these devices are used, the propagation delay time of the circuit is further increased to greatly decrease the digital signal processing frequency.

SUMMARY OF THE INVENTION

It is an object of the present invention to eliminate the conventional drawbacks described above, and has as its object to provide a simple, high-speed multiplexer.

A multiplexer for multiplexing N insertion codes and a digital data signal train having an alternate repetition of a digital data signal using (M−1) continuous time slots and a gap of one time slot, each of N and M being an integer and equal to or greater than 2, said multiplexer comprising a first frequency divider for receiving a clock signal which determines a multiplexing time slot and of frequency dividing said clock signal to produce a first signal having a period of M time slots; a second frequency divider for receiving and frequency dividing the first signal to produce N second signals whose phases are different from each other; first selector means for converting the N insertion codes into one code signal train on the basis of the second signals; and second selector means for receiving the N insertion codes and said digital data signal train and for inserting said N insertion codes of the one code signal train into the gap of one time slot on the basis of the first signal.

DETAILED DESCRIPTION OF THE PREFERRED EMBODIMENT

Figure 4:
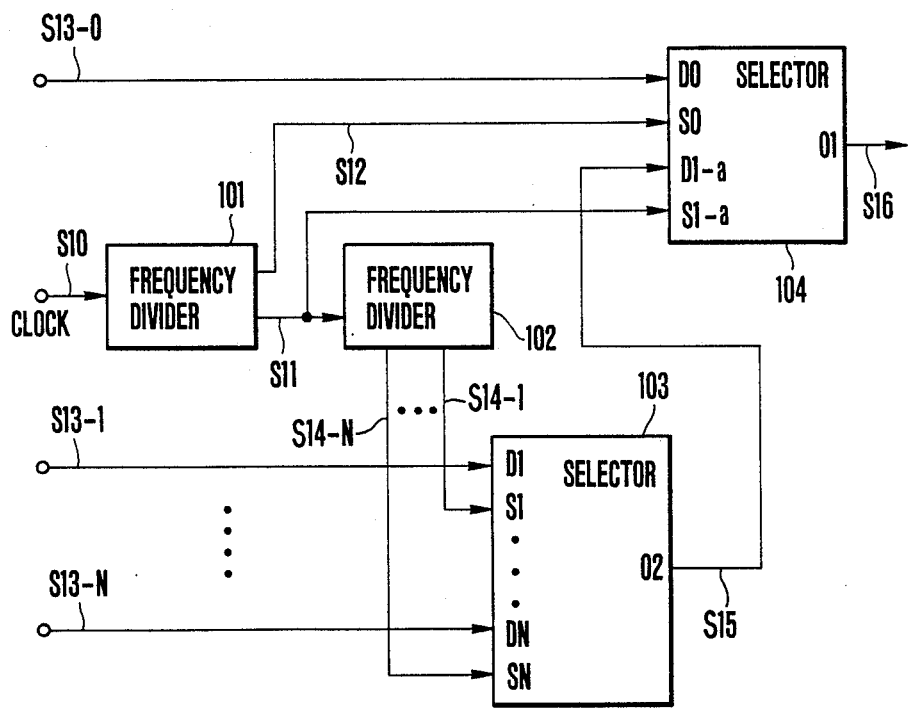
FIG. 4 a block diagram of a multiplexer according to an embodiment of the present invention.
Figure 5:
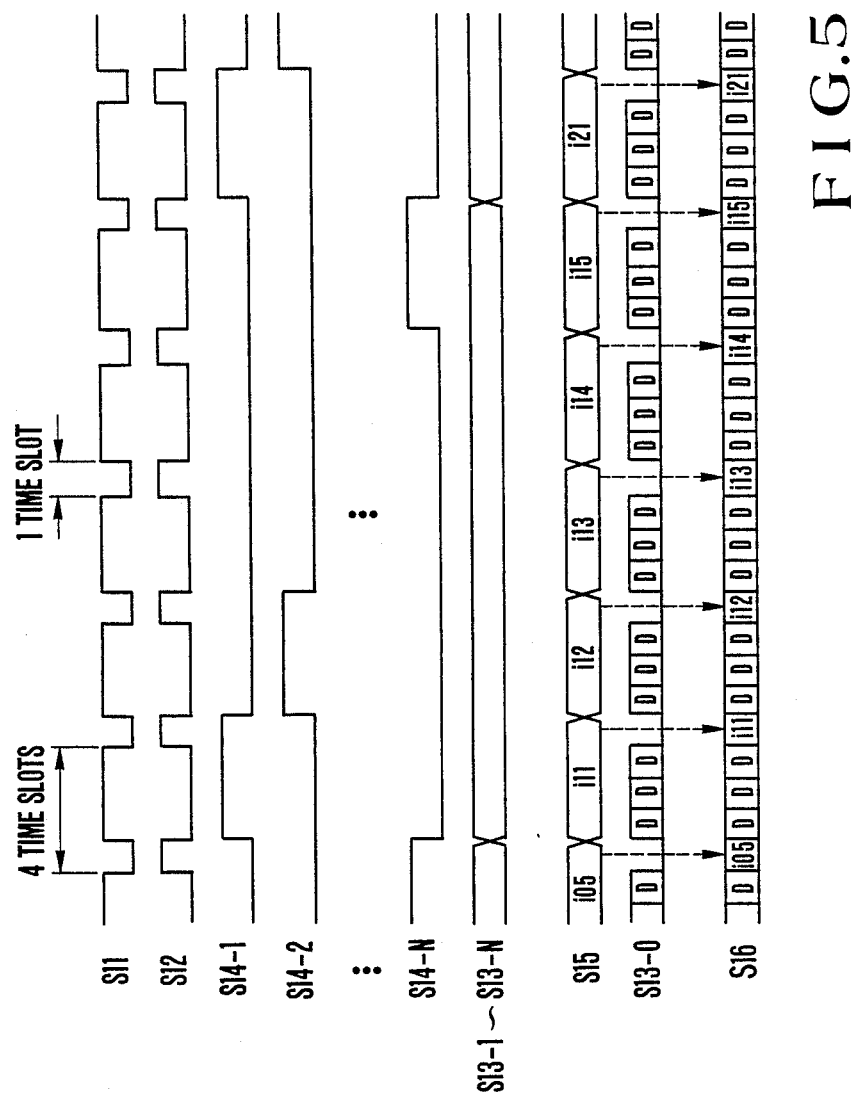
FIG. 5 is a timing chart of signals generated in the multiplexer shown in FIG. 4.

A preferred embodiment of the present invention will be described with reference to the accompanying drawings. FIG. 4 is a block diagram of a multiplexer according to an embodiment of the present invention, and FIG. 5 is a timing chart of signals generated in the multiplexer shown in FIG. 4.

Referring to FIG. 4, a frequency divider 101 receives a clock signal S10 for determining a time slot and generates a signal S11 and its inverted signal S12 every M (e.g., M=4) time slots.

A frequency divider 102 receives the output signal S11 from the frequency divider 101 and generates signals S14-1 to S14-N having N (e.g., N=5) phases and each having a pulse width of M time slots.

A selector 104 has a pair of data and control signal input terminals D0 and S0, another pair of data and control signal input terminals D1-a and S1-a, and an output terminal O1. When signal inputs to the control signal input terminals S0 and S1-a are set at logic "1", signal inputs to the data input terminals D0 and D1-a appear at the output terminal O1, respectively.

Figure 1:
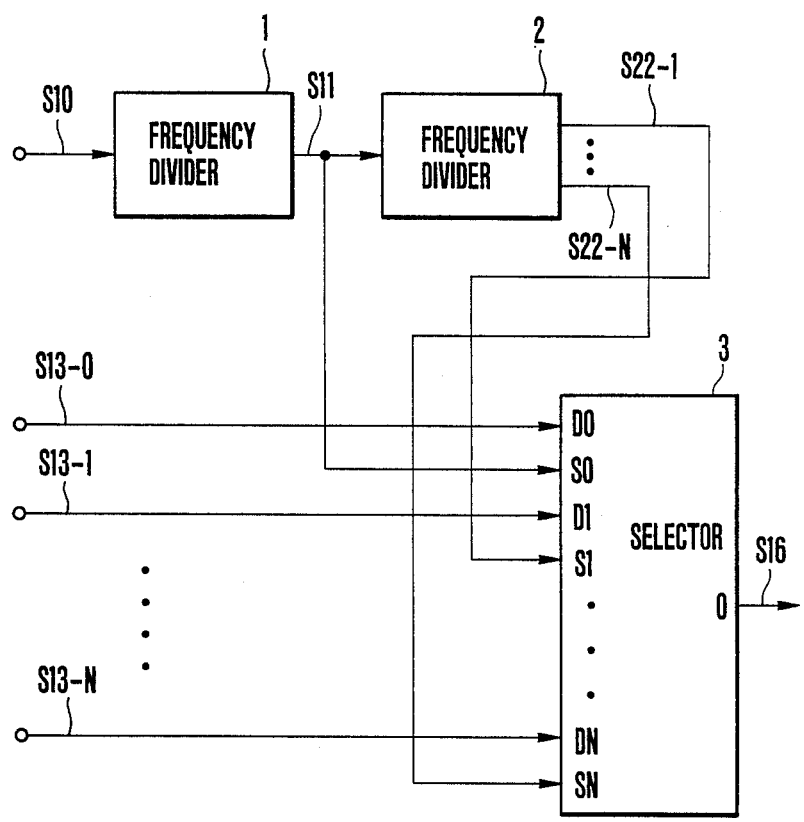
FIG. 1 is a block diagram showing a conventional multiplexer.
Figure 2:
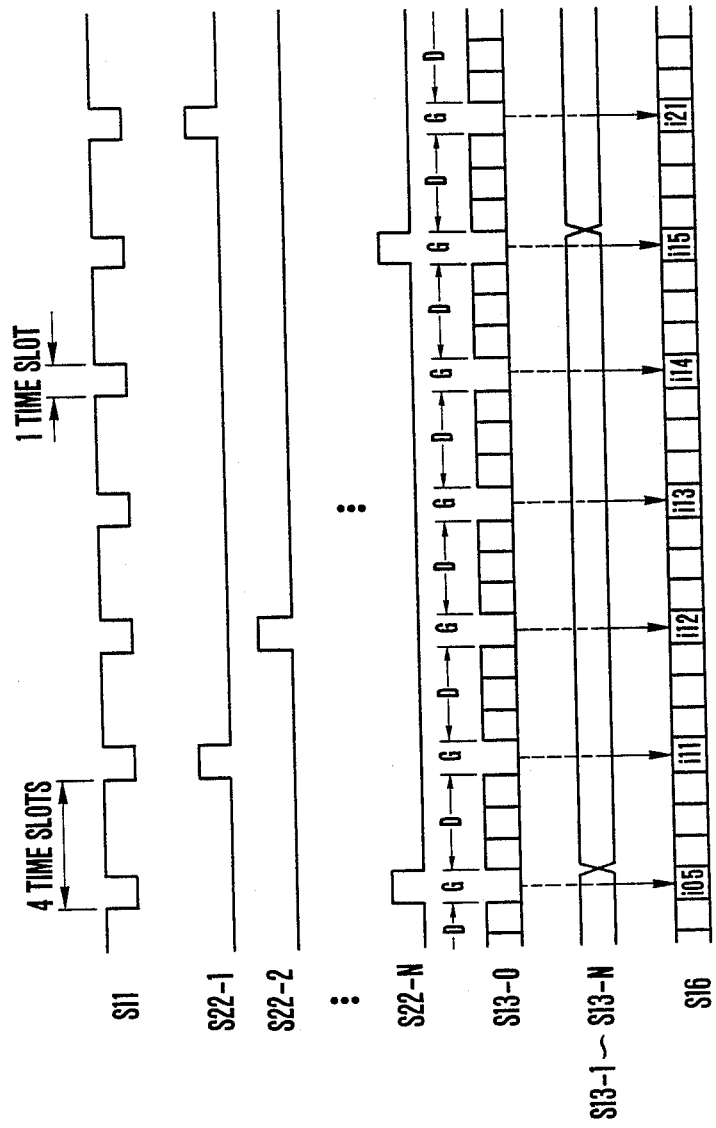
FIG. 2 is a timing chart of signals generated in the multiplexer shown in FIG. 1.
Figure 3:
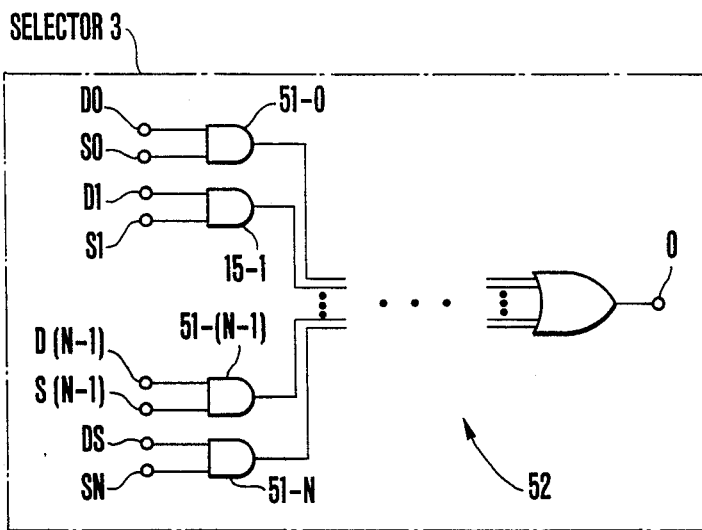
FIG. 3 is a circuit diagram showing an arrangement of a selector shown in FIG. 1.

A selector 103 has N pairs of data and control signal input terminals D1 and S1, D2 and S2, ... DN and SN, and an output terminal O2. When a signal of logic "1" is input to the control signal input terminal Sj, (j is 1 to N), a signal input to the data input terminal Dj paired with the terminal Sj appears at the output terminal O2. The arrangement of the selector 103 is substantially the same as that of the conventional selector shown in FIG. 3 and comprises a multi-stage coupling of N 2-input AND circuits and a multi-input OR circuit.

The output signal S11 of the frequency divider 101 is supplied to the input terminal of the frequency divider 102 and the control signal input terminal S1-a of the selector 104. The output signal S12 of the frequency divider 101 is supplied to the control signal input terminal S0 of the selector 104.

The output signals S14-1 to S14-N of the frequency divider 102 are respectively supplied to the control signal input terminals S1 to SN of the selector 103. The output terminal O2 of the selector 103 is connected to the data input terminal D1 of the selector 104.

A digital data signal train S13-0 consisting of digital data D using (M−1) continuous time slots and a gap of one time slot, as previously described, is supplied to the data input terminal D0 of the selector 104 at a timing shown in FIG. 5.

Insertion code signals S13-1 to S13-N having a frequency of 1/(N×M) of the digital data signal train S13-0 are respectively supplied to the data input terminals D1 to DN of the selector 103.

The insertion code signals S13-1 to S13-N are converted into one code signal train S15 in accordance with the output signals S14-1 to S14-N of the frequency divider 2. The code signal train S15 is supplied from the output terminal O2 to the data input terminal D1 of the selector 4. Therefore, the same output signal S16 as in the conventional multiplexer appears at the output terminal O1 of the selector 104.

According to the present invention as has described above, the selector 103 having a multistage coupling of a large number of logic circuit elements can be operated at 1/(N×M) of the frequency of the digital data signal train S13-0. Therefore, the allowable margin of the circuit propagation delay time can be increased. In addition, since the selector 104 only comprises a pair of 2-input AND circuits and an OR circuit, the number of circuit elements can be reduced, and the operating frequency can be increased.

The operating frequency of the multiplexer according to the present invention does not depend on the number of insertion codes but on the propagation delay time of the a pair of 2-input terminal selector 104, thereby achieving high-speed multiplexing.

In the multiplexer according to the present invention as described above, the N insertion codes requiring only low-speed processing are time-serially converted into a code signal train by the first selector. Subsequently, the digital data signal train and the code signal train are time-serially multiplexed by the second selector. Therefore, the number of circuit elements of the second selector is small. In other words, a circuit having a short propagation delay time can be arranged, and thus the operating frequency of the circuit can be increased.

Furthermore, since the circuit size of a portion subjected to high-speed processing can be reduced, power consumption can be reduced, and MOS devices can be used, thus providing many advantages.

What is claimed is:

1. A multiplexer for multiplexing N insertion codes and a digital data signal train having an alternate repetition of a digital data signal using (M−1) continuous time slots and a gap of one time slot, each of N and M being an integer and equal to or greater than 2, said multiplexer comprising:

a first frequency divider for receiving a clock signal which determines a multiplexing time slot and for frequency dividing said clock signal to produce a first signal having a period of M time slots;

a second frequency divider for receiving and frequency dividing said first signal to produce N second signals whose phases are different from each other;

first selector means for converting said N insertion codes into one code signal train on the basis of said second signals; and second selector means for receiving said one code signal train of N insertion codes and said digital data signal train and for inserting said N insertion codes of said one code signal train into said gap of one time slot one the basis of said first signal.

2. A multiplexer according to claim 1, wherein said first frequency dividing means provides an inverted signal of said first signal, and wherein said second selector means receives said first signal and said inverted signal, selects and outputs the output of said first selector means when said first signal is set at logic "1" and selects and outputs said digital data signal train when said inverted signal is set at logic "1".

3. A multiplexer according to claim 2, wherein
said first selector means comprises N 2-input AND circuits for receiving N pairs of said second signals and said insertion code signals and a multistage logic circuit for coupling the outputs of said AND circuits, and is operated at 1/(N×M) of the frequency of said digital data signal, and said second selector means comprises a first AND gate for receiving said first signal and the output of said first selector means, a second AND gate for receiving said inverted signal of said first signal and said digital data signal, and an OR circuit for receiving outputs from said first and second AND circuits 4. A multiplexer according to claim 1, wherein said insertion code includes a frame synchronization code and a service code.

* * * * *

UNITED STATES PATENT AND TRADEMARK OFFICE
CERTIFICATE OF CORRECTION

PATENT NO. : 4,837,763

DATED : June 6, 1989

INVENTOR(S) : KATSUHIRO SASAKI

It is certified that error appears in the above-identified patent and that said Letters Patent is hereby corrected as shown below:

Col. 3, lines 63 & 64, delete "divider 2" and insert --divider 102--.

Col. 3, line 66, delete "selector 4" and insert --selector 104--.

Signed and Sealed this

Tenth Day of April, 1990

Attest:

*Attesting Officer*

HARRY F. MANBECK, JR.

*Commissioner of Patents and Trademarks*